United States Patent
DeLong et al.

(10) Patent No.: US 6,185,552 B1
(45) Date of Patent: Feb. 6, 2001

(54) METHOD AND APPARATUS USING A BINARY SEARCH ENGINE FOR SEARCHING AND MAINTAINING A DISTRIBUTED DATA STRUCTURE

(75) Inventors: Kenneth J. DeLong, Hollis; Edward A. Heiner, Jr., Londonderry, both of NH (US)

(73) Assignee: 3Com Corporation, Santa Clara, CA (US)

( * ) Notice: Under 35 U.S.C. 154(b), the term of this patent shall be extended for 0 days.

(21) Appl. No.: 09/044,460

(22) Filed: Mar. 19, 1998

(51) Int. Cl.[7] .................................................. G06F 17/30
(52) U.S. Cl. .................... 707/3; 707/2; 707/100; 707/104; 707/201
(58) Field of Search ........................ 707/3, 100, 201, 707/2, 104

(56) References Cited

U.S. PATENT DOCUMENTS

| | | | | |
|---|---|---|---|---|
| 4,947,320 | * | 8/1990 | Crus et al. ........................... | 707/201 |
| 5,012,405 | * | 4/1991 | Nishikado et al. .................. | 707/201 |
| 5,398,338 | * | 3/1995 | Yoshida ................................ | 707/7 |
| 5,539,905 | * | 7/1996 | Nissato ................................. | 707/8 |
| 5,561,793 | * | 10/1996 | Bennett et al. ...................... | 707/201 |
| 5,684,989 | * | 11/1997 | Nissato ................................ | 707/201 |
| 5,778,354 | * | 7/1998 | Leslie et al. ......................... | 707/2 |
| 5,794,243 | * | 8/1998 | Alexander, III et al. ............ | 707/100 |
| 5,860,136 | * | 1/1999 | Fenner ................................. | 711/201 |
| 5,909,686 | * | 6/1999 | Muller et al. ........................ | 707/104 |
| 5,978,795 | * | 11/1999 | Poutanen et al. ................... | 707/3 |
| 6,003,036 | * | 12/1999 | Martin ................................. | 707/102 |
| 6,014,733 | * | 1/2000 | Bennett .............................. | 711/216 |
| 6,070,164 | * | 5/2000 | Vagnozzi ............................ | 707/100 |

OTHER PUBLICATIONS

*The Art of Computer Programming*, Consulting Editors: Richard S. Varga and Michael A. Harrison, Addison–Wesley Publishing Company, Inc., *Sorting and Searching*, (1973) vol. 3: pp. 406–408.

*Programming in C*, Stephen G. Kochan, Hayden Book Co., (1983) pp. 185–189.

* cited by examiner

Primary Examiner—Jean R. Homere
(74) Attorney, Agent, or Firm—Weingarten, Schurgin, Gagnebin & Hayes LLP

(57) ABSTRACT

A distributed data structure providing an indication of the validity of a data value or values associated with a given key value. The data structure has at least one data entry associated with each of plural key entries. The validity indication enables asynchronous updates to key and data entries by preventing retrieval of invalid data values, while enabling a simultaneous search of the key entries for a particular key value. The validity indication also allows the data structure to be sparsely populated; it is possible to mark a key value as invalid such that binary searching of the data structure is unaffected and invalid data is not retrieved. Data structure throughput is enhanced as a result of minimized maintenance overhead.

13 Claims, 5 Drawing Sheets

| KEY | DATA |
|---|---|
| ... | ... |
| FFFF | xxxx |
| BCA2 | 0105 |
| A458 | 1005 |
| A456 | 1008 |
| 813C | 0309 |
| 0512 | 257F |
| 0004 | AA55 |

| KEY | DATA |
|---|---|
| ... | ... |
| BCA2 | 0105 |
| BCA2 | 0105 |
| A458 | 1005 |
| A456 | 1008 |
| 813C | 0309 |
| 0512 | 257F |
| 0004 | AA55 |

| KEY | DATA |
|---|---|
| ... | ... |
| BCA2 | 0105 |
| A458 | 1005 |
| A458 | 1005 |
| A456 | 1008 |
| 813C | 0309 |
| 0512 | 257F |
| 0004 | AA55 |

| KEY | DATA |
|---|---|
| ... | ... |
| BCA2 | 0105 |
| A458 | 1005 |
| A457 | B321 |
| A456 | 1008 |
| 813C | 0309 |
| 0512 | 257F |
| 0004 | AA55 |

FIG. 3
PRIOR ART

| KEY | DATA |
|---|---|
| ... | ... |
| BCA2 | 0105 |
| A458 | 1005 |
| A458 | 1005 |
| A456 | 1008 |
| 813C | 0309 |
| 0512 | 257F |
| 0004 | AA55 |

| KEY | DATA |
|---|---|
| ... | ... |
| BCA2 | 0105 |
| BCA2 | 0105 |
| A458 | 1005 |
| A456 | 1008 |
| 813C | 0309 |
| 0512 | 257F |
| 0004 | AA55 |

| KEY | DATA |
|---|---|
| ... | ... |
| FFFF | xxxx |
| BCA2 | 0105 |
| A458 | 1005 |
| A456 | 1008 |
| 813C | 0309 |
| 0512 | 257F |
| 0004 | AA55 |

| KEY | DATA |
|---|---|
| ... | ... |
| BCA2 | 0105 |
| A458 | 1005 |
| A457 | B321 |
| A456 | 1008 |
| 813C | 0309 |
| 0512 | 257F |
| 0004 | AA55 |

FIG. 4
PRIOR ART

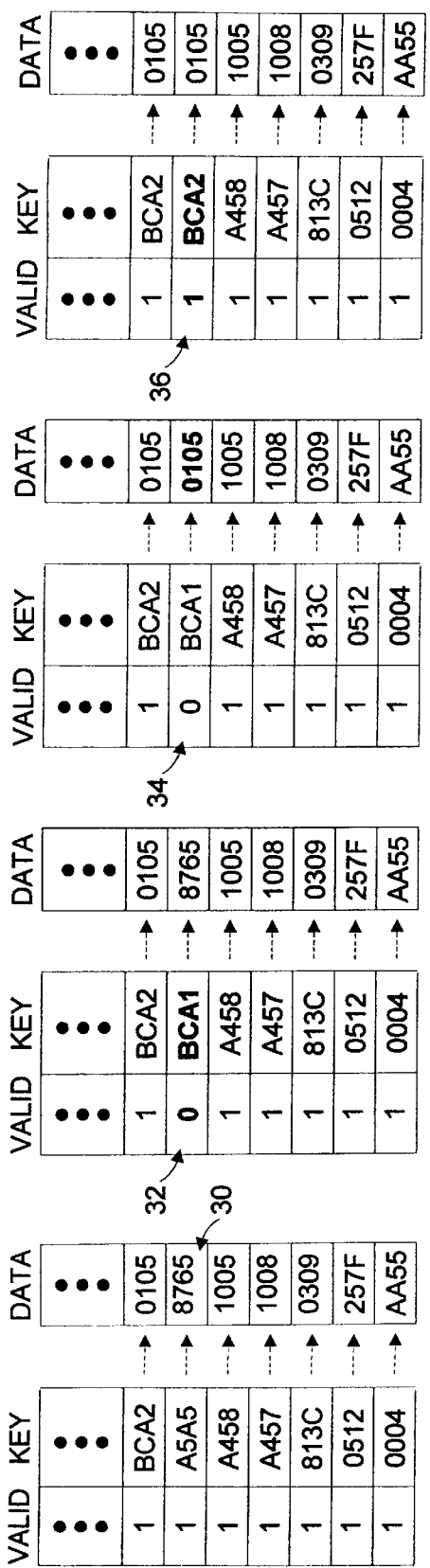
FIG. 6A
FIG. 6B
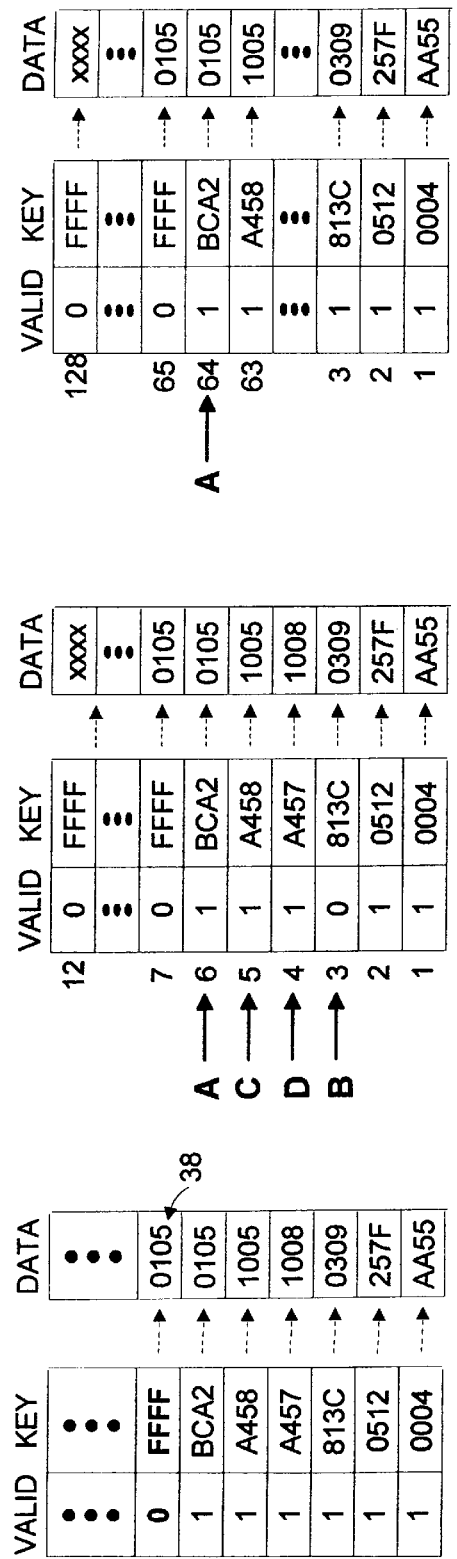
FIG. 7
FIG. 8

| VALID | KEY | DATA |
|---|---|---|
| 0 | FFFF | xxxx |
| 0 | FFFF | xxxx |
| ⋮ | ⋮ | ⋮ |
| 1 | FFFF | 0221 |
| 1 | BCA2 | 0105 |
| 0 | BCA1 | 0105 |
| 0 | BCA0 | 0105 |
| 0 | BC9F | 0105 |
| 1 | A458 | 1005 |
| 1 | A457 | 1008 |
| ⋮ | ⋮ | ⋮ |

FIG. 9

SHUFFLE UP:
    1.    key(n+1) = not valid key(n)
    2.    remove all entries from data(n+1)
    3.    data(n+1) = data(n)
    4.    key(n+1) = valid, key(n)

SHUFFLE DOWN:
    1.    key(n-1) = not valid, [key(n)]-1
    2.    remove all entries from data(n-1)
    3.    data(n-1) = data(n)
    4.    key(n-1) = valid, key(n)

FIG. 10

SHUFFLE UP:
    1.    key(n+1) = not valid, [key(n)]+1
    2.    remove all entries from data(n+1)
    3.    data(n+1) = data(n)
    4.    key(n+1) = valid, key(n)

SHUFFLE DOWN:
    1.    key(n-1) = not valid, key(n)
    2.    remove all entries from data(n-1)
    3.    data(n-1) = data(n)
    4.    key(n-1) = valid, key(n)

FIG. 11

METHOD AND APPARATUS USING A BINARY SEARCH ENGINE FOR SEARCHING AND MAINTAINING A DISTRIBUTED DATA STRUCTURE

BACKGROUND OF THE INVENTION

Data conversion tables frequently take the form of large tables of data having ordered index or "key" entries, each associated with a respective data entry or entries. Each key entry is for storing a key value, and each data entry is for storing a data value. Such a table is illustrated in FIG. 1, wherein the table is comprised of 1 to n key entries, each having an associated data entry. Thus, key entry 5 has a key value of A458 and an associated data entry has the data value of 1005 (key and data values being given in hexadecimal format unless otherwise noted).

A search value is used to return a desired data value from the table. The search value is compared to the key values in a specified order, and the desired data value is retrieved when a key value is located which correlates to the search value.

Tables such as illustrated in FIG. 1 are typically provided from a single physical memory element to simplify data retrieval and table maintenance. In this case, the key entries and the data entries are said to be "unified." Operations affecting the table such as insertions and deletions are referred to "atomic operations" since both a key value and a data value or values are affected at the same time. Such tables have found wide use, such as for data unit address conversion in a variety of settings and data management in database applications.

Sequential processing of a unified data structure is possible, where a search begins at an upper or lower bound of the table and progresses until the desired key value is located or until the opposite bound is reached. The associated data value(s) is then retrieved if a match occurs. This approach is commonly referred to as a linear search.

Linear searching is impractical for large tables (i.e. tables having a relatively large number of entries) due to the length of time necessary to compare or "probe" a search value with the key value at each location. It is possible to suspend linear searching of an ordered table should the key values being compared go beyond the search value, indicating that the searched for value is not in the list. However, given an even chance of successfully finding any one of the key values, on average, half of the key values must be analyzed in performing a linear search.

To improve upon the performance of a linear search, ordered lists are commonly probed using a technique referred to as a binary search, a dichotomizing search in which the table to be searched is divided at each iteration into two equal, or nearly equal, parts. For instance, in an ordered list of twelve entries, a search for a particular search value begins at the sixth key entry. If the key value associated with the sixth key entry of the table is larger than the search value, the lower half of the table contains the searched for key value, if the key value is in the table at all. Otherwise, the key value is in the upper half of the table, if at all. Obviously, the search terminates if the value associated with the sixth key entry equals the search value. The divide by two and compare approach is repeated until the search value is matched to a key value, or it is established that there is no key value equivalent to the search value and the search is aborted.

Unified data structures such as in FIG. 1 are rarely static. Insertions in an ordered table can be performed by overwriting an existing set of key and data values with new values, or by executing a "shuffle up" operation. Deletions are performed by overwriting an existing set of key and data values with a new, dummy set of key and data values, or by executing a "shuffle down" operation. "Up" and "down" are relative directions based upon the ordering of the table.

The problem with inserting by overwriting lies in that it may be desired to keep the overwritten set of key and data values in the table. Thus, the overwritten pair must be rewritten in the next, higher set of entries. The process is repeated until a key/data value set is identified which does not need to be maintained in the table.

Alternatively, the shuffle up approach illustrated in FIG. 3 is employed for key and data value insertion. Here, it is desired to insert key value A457 and associated data value B321 into the first illustrated data structure. Key value FFFF may be regarded as a key value which is undesired, having any associated data value xxxx. In the second illustration, unified key and data values BCA2/0105 are copied into the next higher entries, formerly retaining "FFFF/xxxx". In the third illustration, unified key and data values A458/1005 are copied into the entries formerly occupied by BCA2/0105. Finally, the new values A457/B321 are written into the entries formerly for A458/1005. The proper insertion point is assumed to have been identified by a binary search such as described previously.

A shuffle down operation for the purpose of removing a key/data value pair from the unified data structure is illustrated in FIG. 4. Here, it is desired to remove key value A457 and associated data value B321. In essentially the reverse of the shuffle up process described with regard to FIG. 3, key/data values A458/1005 are overwritten into the entries formerly occupied by the values to be removed. BCA2/0105 take the place of A458/1005, and a new key/data value pair, FFFF/xxxx, is inserted in the place of BCA2/0105. FFFF/xxxx may be dummy values, or new values which were being held for an opportunity to be inserted into the table. The shuffle up and shuffle down operations maintain the integrity of the data in the table so that other searches can be performed during insert and delete operations.

The number of entries in the key table can be indicated by a "limit" value or by the key values stored in the table. If a limit value is not used, unused key entries at the "top" of the table should be filled with a value which is greater than the highest currently used key value to enable the binary search. The unused entries can all have the same, greater value, or can have increasing values. Either way, the binary search process will search for desired key values in the correct manner.

A limitation to the typical binary search approach is that it only works for a table such as illustrated in FIG. 1 comprised of contiguous, ordered key values. If a key value is not ordered with respect to its neighbors, a binary search may be skewed, leading to the failure of the search.

A further drawback associated with unified data tables such as in FIGS. 1, 3 and 4 lies in the amount of memory required if plural data entries are associated with each key entry, or if the data entry or entries are relatively long, or both. Larger unified memory implies higher cost. Further, while memory densities continue to increase with time, a practical limitation will always exist on the size of the data entry or entries for a given key entry size, particularly if ASIC based memory arrays are used.

One proposed resolution to the limitations associated with a unified data table is the provision of a distributed data structure, whereby key values are resident in key entries in a discrete memory element, and respective data entries are located in a separate, discrete memory element. Key and data entries are associated through the use of a pointer field stored in conjunction with each key entry.

Shuffle up and down processes are performed on such distributed data structures as well, though atomic updates are still required in order for the data structure to be searched contemporaneously with table updates. Otherwise, it would be possible for a data entry to temporarily have a value not properly associated with a respective key value, for the search process to identify that key value as matching a search value, and for an incorrect data value to be retrieved.

The requirement for atomic updates for a distributed data structure utilizing pointers to associate respective key and data entries introduces problems in synchronizing the key and data value updates. This typically results in the lowering of update speeds for such structures. Lower update speeds necessarily limit the speed at which search values can be processed using the distributed data structure since the search function must wait for the update function to avoid retrieving incorrect data values. In the context of data communications, such speed limitations result in the need to provide input buffering due to the delays at the distributed data structure. Such buffering means increased cost, space requirements, and design complexity, and introduces the possibility of data loss due to buffer overflow. Additional overhead is consumed in maintaining the key entry-associated pointers.

It is thus desired to have a distributed data structure to avoid the data entry size limitations associated with a unified data structure, and to have the distributed data structure capable of being searched and updated simultaneously without the need for buffering incoming data due to delays associated with the update processes.

BRIEF SUMMARY OF THE INVENTION

The present invention provides a distributed data structure in order to avoid the limitations associated with data entry size in unified data structures. Further, the present invention provides an indication of the validity of a data value or values associated with a given key value. This validity indication in a preferred embodiment is a bit set to a first value to indicate that the data value(s) associated with the key value is valid, and set to a second value to indicate that the data value(s) associated therewith are invalid.

The validity indication enables updates to the presently described distributed data structure to be performed asynchronously, or non-atomically, using a variant on the previously described shuffle up and shuffle down procedures. Specifically, while new key/data value sets are inserted into the data structure by moving existing key/data sets up, as previously described, each move is performed first on the key value, then on the associated data value(s). During the period when the key value has been moved, but not the data value, the key value is indicated as being invalid. Once the associated data has been updated, the key value is marked as being valid. Thus, retrieval of invalid data during a data structure update is avoided.

While affecting the data retrieval function performed using the presently disclosed distributed data structure, the validity indication associated with each key entry is ignored during binary search, except if the search value equals the present key value. If the search value equals a key value marked invalid, the search process moves either up or down, depending upon the embodiment, to the next probe location in the search sequence. Thus, the validity indication enables asynchronous updating of the distributed data structure without affecting contemporaneous searching and data retrieval. By enabling updating and searching at the same time, processing speed is optimized and the need for buffering input data units is removed, or at least reduced.

In addition, the validity indication allows the data structure to be sparsely populated. In known data structures, it is necessary when removing a key/data value set to move all other sets above the target set down to fill in the entries thus vacated. In the presently disclosed distributed data structure, it is possible to simply mark the key value as being invalid without shuffling any entries. Binary searching would be unaffected using the rules developed here for key value ordering, and invalid data is not retrieved. Similarly, given an invalid key entry in the proper location among the ordered key values, it is possible to insert a new key/data value set merely by overwriting an invalid key/data value set at that location. Data structure overhead is thus reduced, further obviating the need for input buffering due to data structure update delays.

BRIEF DESCRIPTION OF THE SEVERAL VIEWS OF THE DRAWING

The invention will be more fully understood by reference to the following description in conjunction with the accompanying drawings of which:

FIG. 3 illustrates a shuffle up procedure as known in the art;

FIG. 4 illustrates a shuffle down procedure as known in the art;

FIGS. 6A and 6B illustrate an asynchronous shuffle down procedure for the distributed data structure of FIG. 2;

FIG. 7 illustrates the operation of a binary search used in conjunction with the data structure of FIG. 2;

FIG. 8 illustrates an alternative embodiment of the binary search of FIG. 7;

FIG. 9 illustrates the ability to perform a binary search on a sparsely populated example of the data structure of FIG. 2; and FIGS. 10 and 11 provide exemplary pseudocode routines for performing shuffle up and down procedures using the data structure of FIG. 2.

DETAILED DESCRIPTION OF THE INVENTION

Figures 1, 2:
FIG. 1 illustrates a unified data structure as known in the art.
FIG. 2 illustrates a distributed data structure as presently disclosed.

A data conversion table as known in the art is illustrated in FIG. 1. This single table is divided into two linear arrays, an array of 1 to n index or "key" entries, and a like number of data entries. Each key entry has an associated data entry. In other known configurations, each key entry has plural data entries. Each key entry retains a key value, and likewise each data entry retains a data value. The illustrative values shown in FIG. 1 are sixteen bits wide and presented in hexadecimal format, though other value lengths are employed as well.

As previously described, such prior art tables are commonly searched using a linear search or, depending upon the application, using a binary search algorithm.

FIG. 2 illustrates an improvement over the unified data structure of FIG. 1. Specifically, the data structure of FIG. 2 is divided into two discrete tables, a search table comprised of valid bits and the key entries having respective key values, and a data table comprised of the data entries having respective data values. As before, the width of the valid bits and the key and data entries can vary depending upon the requirements of the application. Further, there can be more than one data entry per data field, though for the sake of simplicity, only one sixteen bit wide data entry is shown per key entry. For example, key entry 3 in the search table has the key value of 813C (hex), and the associated data table entry has the data value 0309 (hex). In a first embodiment of the present invention, the search table, comprising the valid and key entries, and the data table, comprising the data entries, are disposed in respective memory elements. For example, in one embodiment, the data table is disposed in SRAM.

The valid bits associated with each key entry are illustrated in FIG. 2 as being a single binary digit. In a first embodiment, a value of one indicates that the data value(s) associated with the respective key entry is valid and capable of being retrieved as part of a data conversion operation, to be discussed in greater detail below. A value of zero for the valid bit indicates that the data value is invalid and cannot be retrieved during the data conversion operation. However, a key value is still employed for the purposes of searching the search table, even if an associated valid bit (or bits) indicate that the associated data value is invalid.

The length of the search and data tables is irrelevant to the presently disclosed invention, and can be specified according to the needs of the particular application. In one embodiment, the search table has 128 entries stored in an ASIC-based memory structure and the data table has 16,384 entries stored in a discrete SRAM device.

Each data entry in the data table of FIG. 2 is associated with a respective key entry in the search table based upon the relative position of the key entry within the search table. For instance, since A457 is the key value for entry 4 in the search table, 1008 is the respective data value, being the fourth entry in the data table. As illustrated, the entry number for the search table is used to address the data table. This fixed association of data table entries to search table entries avoids the necessity of employing and maintaining address pointers associated with each key entry to the respective data entry or entries. Accessing data associated with a key entry is thus quicker and requires less hardware in terms of, for instance, ASIC gates. In one embodiment, the position value of a key entry is included in a hash function to select a cache entry, or a set of cache entries, associated with the respective key entry.

A significant benefit of providing the data structure distributed across two tables is that each can be provided within a separate memory device. In the case where the data table is relatively large, placing the valid, key and data fields within a single memory device can significantly increase the cost of the apparatus due to the premium placed on higher density memory devices. Thus a cost savings is realized by physically separating the search table from the data table. However, in certain circumstances, such as where the memory requirements of the data table are not particularly large, it may be more economical to dispose the search table and the data table in the same device.

Separation of the search and data tables also facilitates the independent, asynchronous searching and accessing of the two tables, since separate clock, address and data lines are provided to each when they are disposed apart.

Binary searching was described above in the context of the prior art. With regard to FIG. 7, binary searching is described with respect to the distributed data structure now disclosed. In the illustrated embodiment, there are twelve entries in each of the search and data tables, though in practice, it is expected that there would be significantly more entries.

A value being used as an index into the distributed data structure is referred to herein as a search value. With regard to FIG. 7, assume that the search value is A457. Binary searches generally operate according to the following formula:

$$P_N = \frac{N_T - P_P}{2}$$

$N_T$=number of entries in table
$P_N$=offset for next entry to be probed
$P_P$=number entries encompassed by prior probes
This is also referred to as finding the order of log base 2 of N, or "O $\log_2$ (N)".

Thus, in FIG. 7, searching for A457:

$$P_1 = \frac{12 - 0}{2} = 6$$

The key value at entry six (point "A" in FIG. 7) equals BCA2, which is greater than the search value. The equation is executed again to find the next probe point below the present probe point.

$$P_2 = \frac{12 - 6}{2} = 3$$

The key value at the next probe point, entry 3 (point "B" in FIG. 7) is 813C, lower than the search value. The fact that the valid bit equals zero, indicating that the associated data value is invalid, is irrelevant to this probe operation.

The formula is repeated to determine the next probe point above the current probe point.

$$P_3 = \frac{12 - (6 + 3)}{2} = 1.5$$

It is possible to probe the entry above or below the returned probe point, though the choice should always be made uniformly. Here, the number of entries to skip to the next probe point is rounded up, resulting in a directive to move up two entries to entry five, or point "C" in FIG. 7. The key value of A458 is still above the search value of A457, so the formula is repeated.

$$P_4 = \frac{12 - (6 + 3 + 2)}{2} = 0.5$$

Adhering to the convention of rounding up, the next probe point, entry four (point "D" in FIG. 7), contains a key value of A457, which is the search value. The valid bit in the respective valid entry indicates that the associated data value is valid, and that data value (1008) is available for retrieval.

Consider the case where entry four of the search table of FIG. 7 contains a key value of A456 instead of A457. The search would not have made a match, and this information would be returned to a process which initiated the search.

In another situation, the key value for entry four does match the search value as illustrated, though the valid bit is not set, indicating that the associated data is not valid. This, too, would be reported to the responsible process. The use of the valid bit is further explained below.

In an alternative embodiment of the present invention, the total number of entries in the tables is known, and the first probe point is predefined as being the midpoint of the table. With reference to FIG. 8, there are 128 entries in the search and data tables, as shown. Rather than executing the algorithm referenced above in order to find the first probe point, and thereby unnecessarily consuming clock cycles, the first probe point is predetermined to be at entry 64 (point "A" in FIG. 8). Thereafter, the appropriate half of the distributed data structure is treated as if it were a 64 entry long table.

The presently disclosed conversion tables are used in one embodiment in a data communications network switch operating at high data rates. Therefore, it is imperative that the conversion table be available at all times for data conversion at received data rates, despite the fact that table maintenance must be performed. If this capability to process data at line speed were not provided, expensive and complex buffering would be necessitated.

Figure 5A:
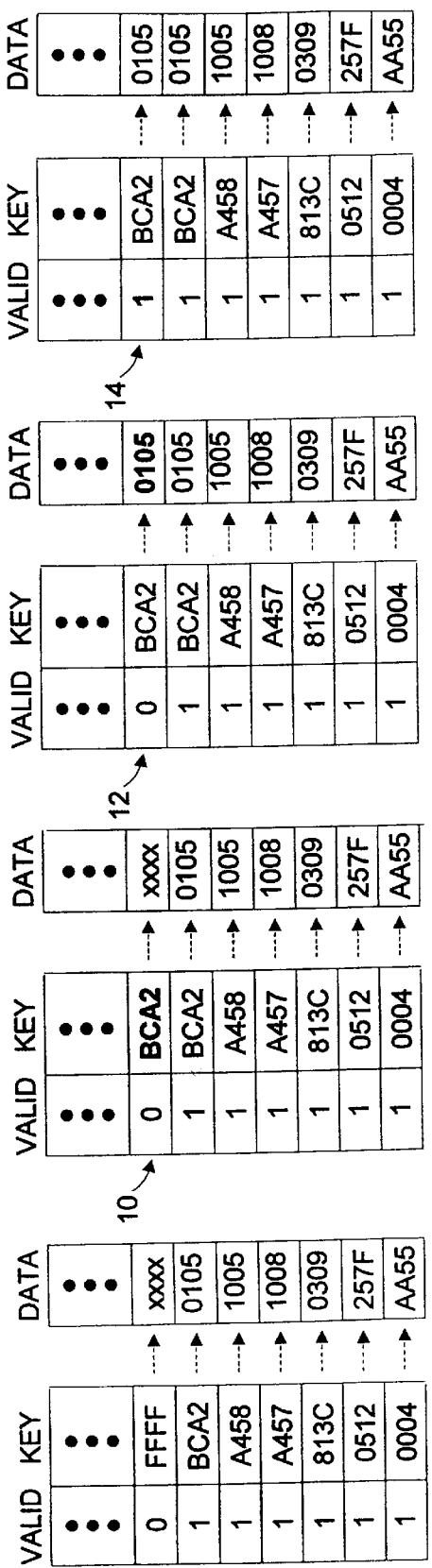
FIGS. 5A and 5B illustrate an asynchronous shuffle up procedure for the distributed data structure of FIG. 2.
Figure 5B:
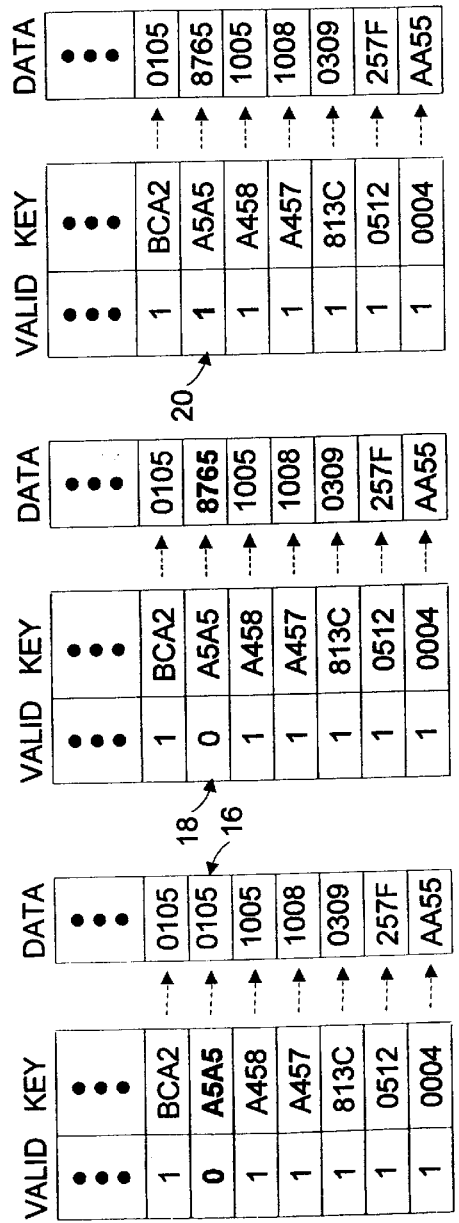

As mentioned, the valid entries are utilized to enable the performance of table maintenance in the "background" while the table is being searched in the "foreground." A typical key/data entry insert operation is illustrated with respect to FIGS. 5A and 5B. It is desired in this example to insert key value A5A5 and associated data value 8765 into the table structure initially illustrated. In this preferred embodiment, the condition of a search value matching a key value that is marked invalid causes the search to respond as if the key value is greater than the search value.

It is necessary to push entries having a key value greater than the new key value, A5A5, up in the table to make room for the new value. As illustrated, the key value having a valid bit set to zero above and closest to the target point of insertion is identified. This is key value FFFF in FIG. 5A. The key value in the entry just below that of key value FFFF, or key value BCA2, is copied and written over FFFF (10). The associated valid bit remains set to zero.

The data value for key value BCA2, or 0105, is then copied into the data entry associated with the copy of key value BCA2 (12). Once the data value has been copied, the associated valid bit is set to one (14) indicating that if the associated key value is probed and matches a search value, this data value is valid and available for retrieval.

Note that at this point, there are two copies of the same key value/data value pair, occupying contiguous locations in the bifurcated table, and both marked as being valid. This does not have a negative impact on either table probing or on data conversion. The data is merely redundant.

Essentially the same procedure is employed to make room for the new key/data pair. The new key value A5A5 is written into the target entry and is marked as invalid (16) to avoid the return of mismatched data, since probe operations are capable of being performed during the presently described insertion routine.

Then, the associated data value, 8765, is written into the respective data entry (18). Lastly, the valid bit is set to one (20), indicating that the data associated with the new entry is now available for retrieval as part of a data conversion operation. The shuffle up operation is summarized in FIG. 10. Step 2 is included to support data structures with a variable number of data entries per key entry. All data entries associated with key entry n+1 must be removed before copying the entries associated with key entry n.

A key/data pair removal operation is illustrated in FIGS. 6A and 6B. Here, it is desired to remove key value A5A5 and associated data value 8765 (30). In a single write operation, the valid bit for the relevant entry is reset and the key value is overwritten with the value from the next higher key/data pair (32) decremented by one. In a subsequent write operation, the data value associated with the newly written key value is copied into the respective data entry (34). Since the search and data tables are disposed on separate memory elements, there is no need to attempt to synchronize the updating of the key and data values. As long as these values are not properly written, the valid bit will remain reset. The decrement operation is required to preserve the binary search since invalid but equal key values cause the search to probe lesser key values in this embodiment.

Once the data values have overwritten the data values to be removed, the valid bit is set for that entry (36) and the key value is incremented by one.

Finally, the next higher entry is made available for further insertions by being set to any appropriately higher key value and by resetting the associated valid bit to zero (38). The data value for this entry is irrelevant. Alternatively, the next higher key/data value pair can be copied down into the now invalid entry, and the process repeated until the highest, valid key value has been copied downward, thus leaving expansion room at the top of the distributed table. This shuffle down operation is summarized in FIG. 10. As with the shuffle up operation, step 2 is included to support a variable number of data entries per key entry. Invalid or dummy values inserted at the top of the distributed data structure are preferably given maximum key values to enable the binary search. It is possible that there is an extended block of invalid entries at the top of a partially populated table according to the present embodiment, each having the same maximum key value and having a reset valid bit (or other indication reflecting invalid associated data).

In an alternative embodiment, the key/data value pair to be removed is effectively done so merely by setting the respective valid bit to zero, but leaving the key and data values in place. This results in a sparsely populated, distributed table.

While the prior art is incapable of searching such a sparsely populated table because of the impact of gaps on the binary search algorithm, the presently disclosed invention can still search using invalid key values, though for data retrieval purposes, the associated data is invalid. In FIG. 9, a distributed data structure according to the present invention is illustrated in which two extended invalid regions are shown. The associated data values are effectively removed from the data structure for data retrieval purposes, but the keys are used to direct the binary search. This results in the sparsely populated table referenced above.

Certain benefits flow from the utilization of a sparsely populated table, including the increased likelihood that an "open" key/data entry pair is near a location where one wishes to insert a new key/data value pair. It is also possible that the desired insertion point is presently occupied by an invalid key/data value pair, and no shuffling is required; the new key/data values are merely written into the target entries. The sparsely populated table thus minimizes processing time required to shuffle up and shuffle down.

In an alternative embodiment, the boundary condition of a search value matching an invalid key value can cause the search to proceed as though the key value is less than the search value. The shuffle up and shuffle down mechanisms are summarized in FIG. 11 for this embodiment. An interesting boudnary condition arises in this case. The maximum value of the key will be stored in the last location of the key table. This results naturally from the algorithms described.

Certain protocols must be defined and adhered to consistently. For instance, it must be predetermined what to do if an index value equals a search value, but the associated valid bit indicates that the respective data value(s) is invalid. In one embodiment of the presently disclosed invention, which works with the insertion and removal procedures described with respect to FIGS. 5A, 5B, 6A and 6B, the next lower entry in the search sequence is probed for the search value. For instance, at reference 10 of FIG. 5A, a comparison of the upper key value of BCA2 and the same search value returns a match, but the valid bit is set to zero. By continuing the search in the lower portion of the table, the same key value is found, with an associated valid bit set. Since valid bits and key values can be written at the same time (i.e. atomically), the case where a searched-for key value is marked invalid, while the same key value marked valid is above it, will not occur.

These and other examples of the invention illustrated above are intended by way of example and the actual scope of the invention is to be limited solely by the scope and spirit of the following claims.

What is claimed is:

1. A binary search engine for identifying a data value associated with a search value, comprising:
   a search table including plural key entries, each of said plural key entries having either a valid or an invalid key value, said key values of said key entries arranged numerically in said search table;
   a data table associated with said search table and including plural data entries, each for retaining a respective data value, wherein each key entry has an associated data entry identified using the relative position of the respective key entry within said search table; and
   a logic unit, in communication with said search and data tables, for searching said search table for a valid key value corresponding to said search value and for identifying a data value from a data entry associated with said corresponding key value.

2. The binary search engine of claim 1, wherein said logic unit is adapted for assigning a new key value to a key entry of said search table, for marking said new key value as an invalid key value, for inserting a data value into a data entry associated with said key entry of said new key value, and for marking said new key value as valid.

3. The binary search engine of claim 2, wherein said logic unit is further for simultaneously assigning said new key value to said key entry of said search table and marking said new key value as an invalid key value, and for asynchronously inserting said data value into said data entry associated with said key entry of said new key value.

4. The binary search engine of claim 1, wherein said logic unit is adapted for removing a key value and an associated data value from said search table and said data table, respectively, by marking said key value as an invalid key value, and for leaving a respective data value unaffected.

5. The binary search engine of claim 1, wherein said logic unit is adapted for moving a key value of said search table from a first key entry to a contiguous second key entry by:
   copying said key value into said second key entry and simultaneously marking said copied key value as invalid;
   copying a data value of a data entry associated with said first key entry into a data entry associated with said second key entry;
   marking said key value of said second key entry as valid; and
   marking said key value of said first key entry as invalid.

6. The binary search engine of claim 5, wherein said logic unit is further adapted for:
   inserting a new key value into said second key entry;
   inserting a new data value into said data entry associated with said second key entry; and
   for making said new value as valid.

7. A binary search engine for identifying a data value associated with a search value, comprising:
   a search table having key entries for storing a respective key value and corresponding validity value;
   a data table having plural data entries for storing a respective data value, each data entry associated with a respective key entry; and
   a logic unit in communication with both of said search and data tables, said logic unit for searching said search table to identify a key value corresponding to a search value,
      wherein a validity entry for each of a first subset of said key entries indicates said respective data entry is invalid, and a validity entry for each of a second subset of said key entries indicates said respective data entry is invalid.

8. The data conversion apparatus of claim 7, wherein said logic unit is adapted for installing a new key value in a key entry and a new, associated data value in a respective data entry by writing said new key value in said key entry and setting said corresponding validity entry to reflect the invalidity of the data value in said respective data entry.

9. The data conversion apparatus of claim 7, wherein said logic unit is adapted for maintaining said search and data tables while contemporaneously searching said search table to identify said key value corresponding to said search value.

10. A method of retrieving a data value using a binary search on a discontinuously populated data structure, comprising the steps of:
   identifying a search value using a logic unit;
   using a binary search algorithm, by said logic unit, to locate, in a search table associated with said logic unit, a key value corresponding to said search value;
   determining, by said logic unit, if a validity indication associated with said located key value indicates that an associated data value is valid;
   retrieving said data value, by said logic unit, from a data table associated with said logic unit only if said validity indication indicates said data value is valid;
   repeating the steps of using, determining and retrieving for said search value using the logic unit if said validity indication indicates that said data value is invalid and until the step of using fails to locate said key value corresponding to said search value.

11. The method of claim 10, further comprising the steps of:
   installing a new key value in said search table and a respective data value in said data table, by said logic unit, while said step of using said binary algorithm is being used by said logic unit to locate said key value corresponding to said search value.

12. The method of claim 11, further comprising the logic unit executed steps of:
   writing said new key value in said search table and setting said validity indication as a bit in said search table in a state indicating an associated data value is invalid;
   writing said respective data value in said data table after and asynchronously with said step of writing said new key value; and rewriting said validity indication as said bit in said search table in a state indicating said associated data value is valid.

13. The method of claim 11, further comprising the logic unit executed steps of:

copying first key value from a first location in said search table into a second location in said search table and contemporaneously setting a validity indication associated with said search table second location to a state reflecting the invalidity of a respective data value in a second location in said data table;

copying a first data value associated with said first key value from a first location in said data table into a second location in said data table as said respective data value;

resetting said validity indication associated with said search table second location to a state reflecting the validity of said respective data value;

installing said new key value in said first location of search table and contemporaneously setting a validity indication associated with a said search table first location to a state reflecting the invalidity of a respective data value in said first location in said data table;

installing said respective data value in said data table first location; and resetting said validity indication associated with said search table first location to a state reflecting the validity of said respective first location data value.

* * * * *

UNITED STATES PATENT AND TRADEMARK OFFICE
CERTIFICATE OF CORRECTION

PATENT NO. : 6,185,552 B1
DATED : February 6, 2001
INVENTOR(S) : Kenneth J. DeLong et al.

It is certified that error appears in the above-identified patent and that said Letters Patent is hereby corrected as shown below:

Column 10,
Line 7, "making" should read -- marking --;
Line 11, "validity value" should read -- validity entries for storing a respective validity value; --; and
Line 23, "invalid." should read -- valid. --.

Signed and Sealed this

Second Day of July, 2002

Attest:

Attesting Officer

JAMES E. ROGAN
Director of the United States Patent and Trademark Office